(12) United States Patent
Trimnell (10) Patent No.: US 12,459,314 B2
(45) Date of Patent: Nov. 4, 2025

(54) GPS TRACKER HOUSING FOR AN INFLATION VALVE

(71) Applicant: Alex Trimnell, Poole (GB)

(72) Inventor: Alex Trimnell, Poole (GB)

( * ) Notice: Subject to any disclaimer, the term of this patent is extended or adjusted under 35 U.S.C. 154(b) by 80 days.

(21) Appl. No.: 18/569,994

(22) PCT Filed: Jun. 7, 2022

(86) PCT No.: PCT/GB2022/051418
§ 371 (c)(1),
(2) Date: Dec. 13, 2023

(87) PCT Pub. No.: WO2022/263791
PCT Pub. Date: Dec. 22, 2022

(65) Prior Publication Data
US 2024/0239144 A1    Jul. 18, 2024

(30) Foreign Application Priority Data

Jun. 16, 2021 (GB) ...................... 2108579

(51) Int. Cl.
*B60C 29/06* (2006.01)
*G01S 19/16* (2010.01)
*G01S 19/35* (2010.01)

(52) U.S. Cl.
CPC .............. *B60C 29/06* (2013.01); *G01S 19/16* (2013.01); *G01S 19/35* (2013.01)

(58) Field of Classification Search
CPC ......... B60C 29/06; G01S 19/16; G01S 19/35; G08B 13/1427; G08B 21/0269; G08B 21/0288
See application file for complete search history.

(56) References Cited

U.S. PATENT DOCUMENTS 7,538,660 B2 * 5/2009 Murakami .......... B60C 23/0408
  73/146
8,567,241 B2 * 10/2013 Falkenborg ......... B60C 23/0494
  73/146.8

(Continued)

FOREIGN PATENT DOCUMENTS

CN    204256170 U    4/2015
CN    106926647 A    7/2017
CN    208053006 U    11/2018

OTHER PUBLICATIONS

GB Search Report issued for GB App No. GB2108579.0 issued Mar. 31, 2022 (7 pages).

(Continued)

*Primary Examiner* — John A Tweel, Jr.
(74) *Attorney, Agent, or Firm* — Foley & Lardner LLP (57) ABSTRACT

This invention relates to a housing for a GPS tracker, the housing being attachable to an inflation valve and comprising: a receptacle in the housing which is shaped to accept a GPS tracker, and a connector for attaching the housing to the inflation valve. The invention also relates to a GPS tracker housing kit comprising: a housing as described above, an inflation valve, and optionally one or more of: a GPS tracker, one of more grommets which are shaped to fit around the inflation valve, a tyre rim, and a tyre. In addition, the invention relates to the combination of the housing as described above and an inflation valve, wherein the housing is attached to the inflation valve.

22 Claims, 5 Drawing Sheets

(56) References Cited

U.S. PATENT DOCUMENTS

| | | | |
|---|---|---|---|
| 9,604,508 B2* | 3/2017 | Lesesky | ............. B60C 23/0493 |
| 9,821,766 B2 | 11/2017 | Gaskin | |
| 10,203,041 B2* | 2/2019 | Smith, Jr. | ............... B60C 25/18 |
| 10,757,379 B2 | 8/2020 | Piccioni | |
| 2006/0249323 A1* | 11/2006 | Kurata | ............... B60C 23/0483 |
| | | | 180/233 |

OTHER PUBLICATIONS

International Search Report and Written Opinion issued for PCT App No. PCT/GB2022/051418 issued Aug. 10, 2022 (11 pages).

\* cited by examiner

GPS TRACKER HOUSING FOR AN INFLATION VALVE

CROSS-REFERENCE TO RELATED APPLICATIONS

This application is a U.S. National Phase Application under 35 U.S.C. § 371 of International Application No. PCT/GB2022/051418, filed on Jun. 7, 2022, which claims the benefit of and priority to GB Appl. No. 2108579.0 filed Jun. 16, 2021, each of which is incorporated herein by reference in their entirety for any and all purposes.

This invention relates to a housing for a GPS tracker, the housing being attachable to an inflation valve, as well as to a GPS tracker housing kit and the combination of the housing and an inflation valve.

BACKGROUND

The monetary value of various motor-driven (e.g. cars, motorcycles, scooters) or self-propelled vehicles (e.g. bicycles) means that they can be targeted by thieves. The recent development of small, low cost, GPS trackers such as the Apple AirTag and the Tile has resulted in their use in the tracking of a range of valuable items. However, a problem when fitting them to certain vehicles, for example bicycles, has been how to conceal the GPS tracker within the vehicle without affecting the vehicle's functionality.

An improved means for attaching a GPS tracker to a vehicle, for example a self-propelled vehicle such as a bicycle, has been sought.

STATEMENT OF INVENTION

This invention relates to a housing for a GPS tracker, the housing being attachable to an inflation valve and comprising:
(a) a receptacle in the housing which is shaped to accept a GPS tracker, and
(b) a connector for attaching the housing to the inflation valve.

In particular, the GPS tracker may be an Apple AirTag or a Tile GPS tracker.

More particularly, the housing may comprise a head comprising the receptacle, and a stem comprising the connector which extends from a lower surface of the head. In the context of the invention, the term "lower" is used to refer to the part of the housing that, in use, is closest to the rim of the wheel to which the inflation valve is attached. Similarly, the term "upper" is used to refer to the part of the housing that, in use, is furthest from the rim of the wheel to which the inflation valve is attached.

In particular, the receptacle may be in the form of a recess which is shaped to accept a GPS tracker.

More particularly, the housing may comprise a base comprising the head and stem, and a removable cap which is shaped to fit over the head. In particular, the removable cap may be shaped to fit over the head such that it forms a cavity which is shaped to enclose a GPS tracker.

More particularly, the receptacle may comprise a lower surface, side walls extending upwards from the lower surface, and a lip which extends inwardly from the side wall such that, in use, the GPS tracker is retained in the receptacle by the lip. In particular, the lip may define an upper opening having a cross-sectional area which is slightly smaller than that of the GPS tracker. In particular, the receptacle may be shaped to provide a close fit around the GPS tracker. For example, if the GPS tracker is an Apple AirTag, the receptacle may be substantially the same size as the Apple AirTag.

More particularly, the base and/or the removable cap may be formed from a resiliently flexible material. Even more particularly, the base may be formed from ethylene propylene diene monomer rubber. In particular, the removable cap may be formed from a silicone-based material, more particularly fluorosilicone rubber.

More particularly, the inflation valve to which the housing is attachable may comprise a first end comprising a valve base, and a second end comprising a valve core which is adapted for connection to an inflation device. Even more particularly, the inflation valve may comprise a screw-threaded valve body between the valve base and the valve core.

In particular, the stem may comprise one or more apertures for allowing flow of air and/or sealant through the stem. More particularly, the stem may comprise at least two apertures for allowing flow of air and/or sealant through the stem. These apertures can also absorb compression/impact forces that may be experienced by the housing during use.

In particular, the stem may comprise, at an opposite end to the head, a valve base aperture which is shaped to accept a valve base of an inflation valve. More particularly, the valve base aperture may be substantially circular. In particular, the valve base aperture may have a cross-section which is smaller than that of the valve base, such that the valve base can be retained in the stem.

More particularly, the housing may be attachable to an inflation valve of a tyre of a bicycle, motorcycle, scooter, car or lorry, even more particularly a bicycle, more particularly a mountain bike.

This invention also relates to a GPS tracker housing kit comprising:
(a) a housing as described above,
(b) an inflation valve,
and optionally one or more of:
(c) a GPS tracker,
(d) one of more grommets which are shaped to fit around the inflation valve,
(e) a tyre rim, and
(f) a tyre.

In particular, the one or more grommets may comprise a through-hole which is shaped to mate with a valve body of the inflation valve. More particularly, the one or more grommets may be formed from a resiliently flexible material. Even more particularly, the resiliently flexible material may be a silicone-based material such as fluorosilicone rubber, or ethylene propylene diene monomer (EPDM) rubber.

In particular, the tyre may be a tubeless tyre. Tubeless tyres usually have the same general structure as a conventional pneumatic tyre, but without the inner tube. Instead, the outer body of the tyre (which is usually formed from rubber and which contacts the surface along which the vehicle is to travel) is manufactured or treated such that it creates a substantially airtight seal between the outer body and the rim of the tyre. For example, a sealant may be applied to the inner surface of the outer body of the tyre. In some embodiments, an annular foam tyre insert may be provided within the tubeless tyre. More particularly, the annular foam tyre insert may comprise a recess which is shaped to accept the housing of the invention.

In addition, this invention relates to the combination of the housing as described above and an inflation valve, wherein the housing is attached to the inflation valve.

In particular, the combination may comprise a GPS tracker in the receptacle of the housing. More particularly, a grommet may be fitted to the inflation valve. Even more particularly, this invention relates to the combination described above when fitted to a tyre rim.

In a second aspect, this invention relates to an inflation valve comprising a housing for a GPS tracker, the housing comprising a receptacle which is shaped to accept a GPS tracker. In particular, the GPS tracker may be as defined above.

More particularly, the inflation valve may comprise a first end comprising a valve base upon which is fitted the housing, and a second end comprising a valve core which is adapted for connection to an inflation device. Even more particularly, the inflation valve may comprise a screw-threaded valve body between the valve base and the valve core.

In particular, the housing may comprise a head comprising the receptacle. More particularly, the receptacle may be in the form of a recess which is shaped to accept a GPS tracker.

More particularly, the housing may comprise a removable cap which is shaped to fit over the head. Even more particularly, the removable cap may be shaped to fit over the head such that it forms a cavity which is shaped to enclose a GPS tracker.

In particular, the head and/or the removable cap may be formed from a resiliently flexible material. More particularly, the head may be formed from ethylene propylene diene monomer rubber. Even more particularly, the removable cap may be formed from fluorosilicone rubber.

The second aspect of invention also relates to a GPS tracker housing kit comprising:
(a) an inflation valve as defined above,
and one or more of:
(b) a GPS tracker,
(c) one of more grommets which are shaped to fit around the inflation valve,
(d) a tyre rim, and
(e) a tyre.

In addition, the second aspect invention of the relates to an inflation valve as defined above comprising a GPS tracker in the receptacle of the housing. In particular, a grommet may be fitted to the inflation valve. The second aspect of the invention also relates to inflation valve as defined above when fitted to a tyre rim.

In a third aspect, this invention relates to a mounting for a GPS tracker, the mounting being shaped for attachment to a surface of a tyre rim which surface, in use, faces a tyre attached to the rim. The third aspect of the invention also relates to a kit comprising (a) a tyre rim, (b) a mounting for a GPS tracker as defined above, and optionally (c) a GPS tracker. In addition, the third aspect of the invention relates to a tyre rim fitted with a mounting for a GPS tracker as defined above.

BRIEF DESCRIPTION OF THE DRAWINGS

This invention will be further described by reference to the following Figures which are not intended to limit the scope of the invention claimed, in which:

DETAILED DESCRIPTION

Figure 1:
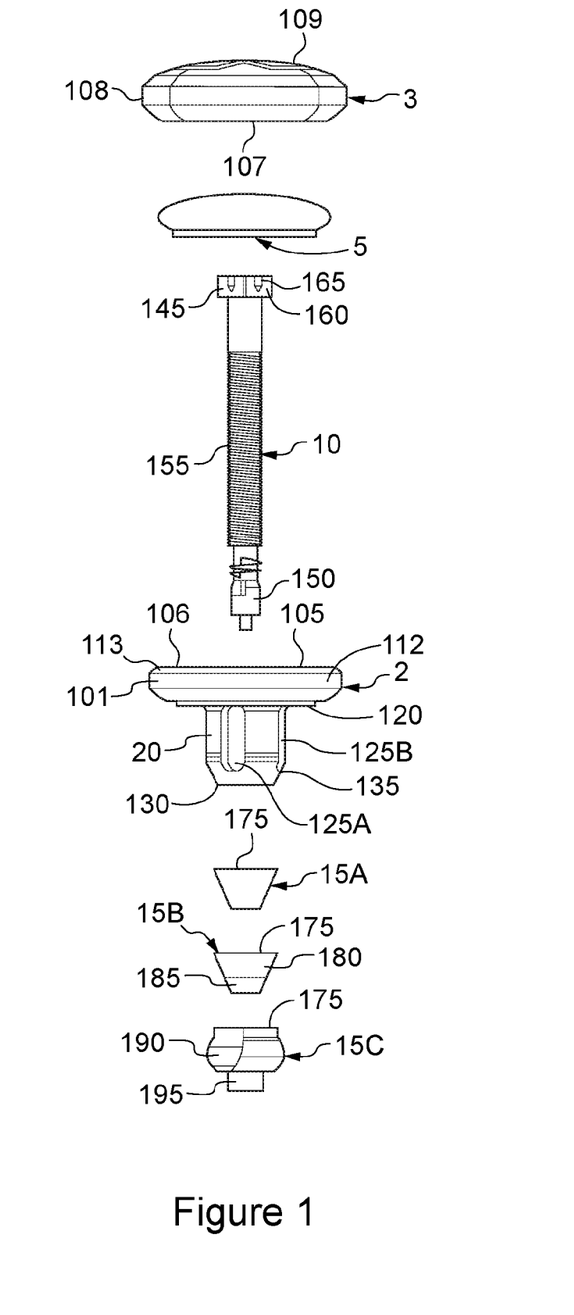
FIG. 1 shows an exploded side-on view of the housing of the invention, a GPS tracker, an inflation valve and three optional grommets.
Figure 2:
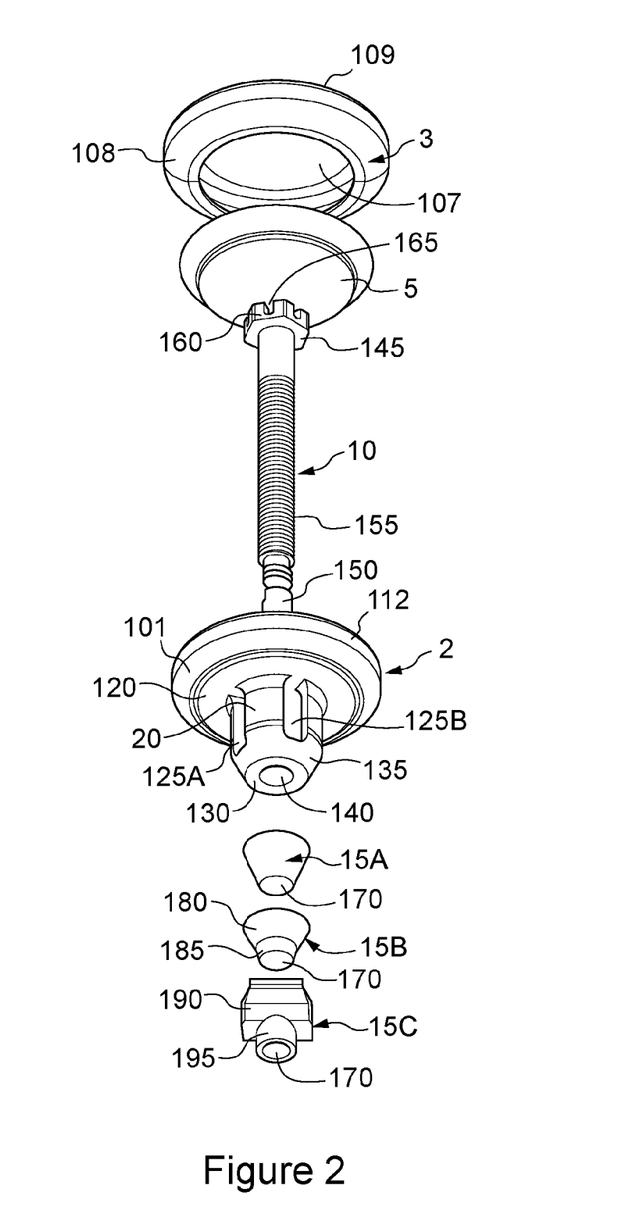
FIG. 2 shows a perspective view of the items shown in FIG. 1.

FIGS. 1 and 2 show side-on and perspective views of a housing according to the invention. The embodiment shown is the one in which the housing is attachable to (and removable from) an inflation valve. However, as described above it is possible for the housing to be formed as part of the inflation valve.

As shown in FIGS. 1 and 2, the housing comprises two parts, a base 2 and a cap 3. Also shown in FIGS. 1 and 2 are GPS tracker 5 (in this embodiment, an Apple AirTag), inflation valve 10, and grommets 15A, 15B and 15C.

The base 2 is formed from a resiliently flexible material, for example a synthetic rubber such as ethylene propylene diene monomer (EPDM) rubber. The base 2 comprises a head portion 101 comprising receptacle 105 (the interior of which is only visible in FIG. 5) which is shaped to accept the GPS tracker 5.

In the Figures, the receptacle 105 of head portion 101 is shaped to accept a GPS tracker in the form of an Apple AirTag. The receptacle 105 comprises a lower surface 111 (only visible in FIG. 5), upwardly extending side wall 112, and inwardly extending lip 113 (not visible in FIG. 2). Lip 113 defines an opening 106 at the upper end of head portion 101 which is slightly smaller than the GPS tracker. The deformable nature of the material from which the base 2 is made means that the GPS tracker can be pushed through the opening 106 and into receptacle 105 in the head portion 101. In this way, the GPS tracker can be retained in receptacle 105 by the lip 113. In particular, the receptacle 105 is shaped to closely fit around the Apple AirTag. However, alternative shapes can be utilised depending on the GPS tracker being used (e.g. a Tile GPS tracker, etc.).

The base 2 also comprises stem 20 which extends from a lower surface 120 of head portion 101. The stem 20 is substantially cylindrical and comprises four oblong apertures 125A, 125B, 125C and 125D (not all of which are visible in the Figures) in the part of the stem 20 which is closest to lower surface 120. These apertures 125A, 125B, 125C, 125D are provided in order to allow the flow of air and sealant into the tyre to which the housing is to be fitted. The apertures 125A, 125B, 125C, 125D can also absorb compression/impact forces that may be experienced by the housing during use. The number, size and shape of the apertures can be varied.

Towards its lower end 130, stem 20 is provided with inwardly tapered section 135. A circular through-hole 140 (not visible in FIG. 1) is then provided at the lower end 130.

As noted above, the housing of the invention also comprises cap 3. The cap 3 is formed from a resiliently flexible material, for example a silicone-based material such as FluoroSilicone Rubber (FSR). The cap 3 comprises opening 107 on its lower side, and side wall 108 extending upwards from the opening 107. The opening 107 and side wall 108 are both shaped to fit over and around the head portion 101 of base 2, and in this embodiment are both annular. Cap 3 also comprises top section 109 which, when the cap 3 fitted over head portion 101 of base 2, forms a cavity which encloses the GPS tracker 5 in receptacle 105.

As shown in FIGS. 1 and 2, the inflation valve 10 to which the housing is fitted comprises valve base 145 at its first end and valve core 150 at its second end. Valve base 145 and valve core 150 are connected by valve body 155 which is in the form of a screw-threaded cylinder. Inflation valve 10 may comprise any suitable tubeless valve system as is known in the art.

Although not shown in the Figures, there is a conduit extending through the inflation valve 10, providing fluid connection between valve base 145 and valve core 150 via the interior of valve body 155.

Valve base 145 has a larger cross-section than valve body 155 and is hexagonal in shape, although other valve base shapes could be utilised. The valve base 145 tapers slightly as it extends away from valve body 155. Each of the six side faces (one indicated by way of example as 160) of the valve base 145 are provided with a channel 165 in order to allow the flow of air through the inflation valve 10 and into the tyre to which the housing 1 is to be fitted.

Also shown in FIGS. 1 and 2 are grommets 15A, 15B and 15C, which are formed from the same material as the base 2 of the housing. Alternatively, they could be formed from the same material as the cap 3 of the housing. As shown in FIG. 2, all three grommets 15A, 15B, 15C are provided with an internal cylindrical through hole 170 (not visible in FIG. 1) which is shaped to mate with the screw-thread of valve body 155.

Each grommet 15A, 15B, 15C has an upper surface 175 (not visible in FIG. 2) which is shaped to abut the lower end 130 of stem 20 during use. Grommet 15A is in the form of a truncated cone which tapers as it extends away from upper surface 175. Grommet 15B has a similar truncated cone shape, except that it comprises two tapering sections. First tapering section 180 extends away from upper surface 175. This then abuts second tapering section 185 which has a shallower taper than first tapering section 180. Grommet 15C has a bulbous section 190 adjacent to its upper surface 175. Cylindrical section 195 then extends away from the opposite end of the bulbous section. The grommets 15A, 15B, 15C are provided in order to provide a good seal between the inflation valve 10 and the rim of the tyre to it is to be fitted.

Figure 3:
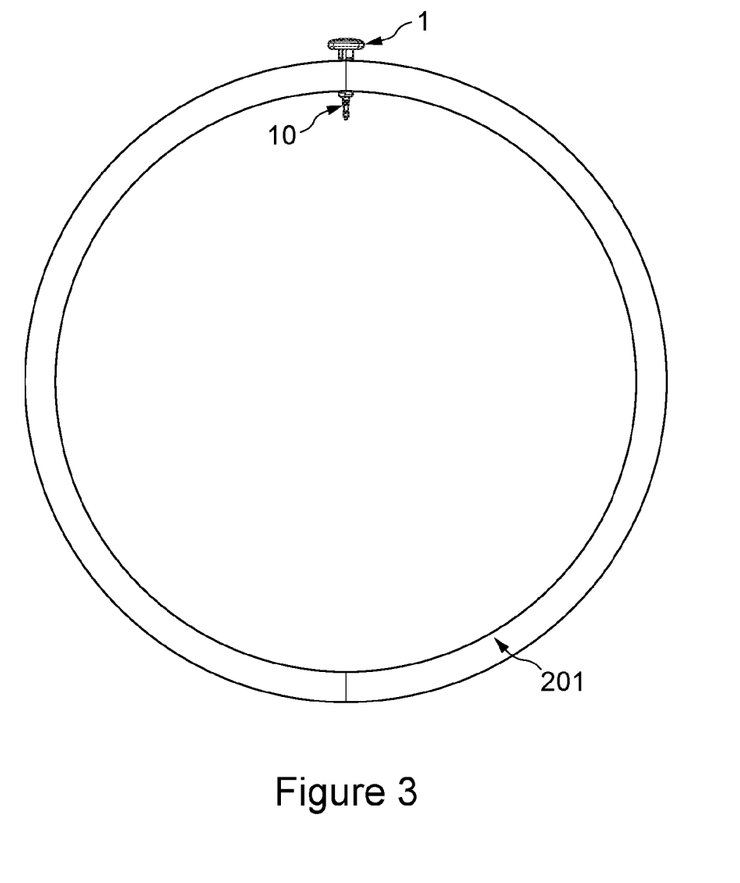
FIG. 3 shows a side view of the items shown FIG. 1, and one of the grommets, when fitted to a tyre rim.
Figure 4:
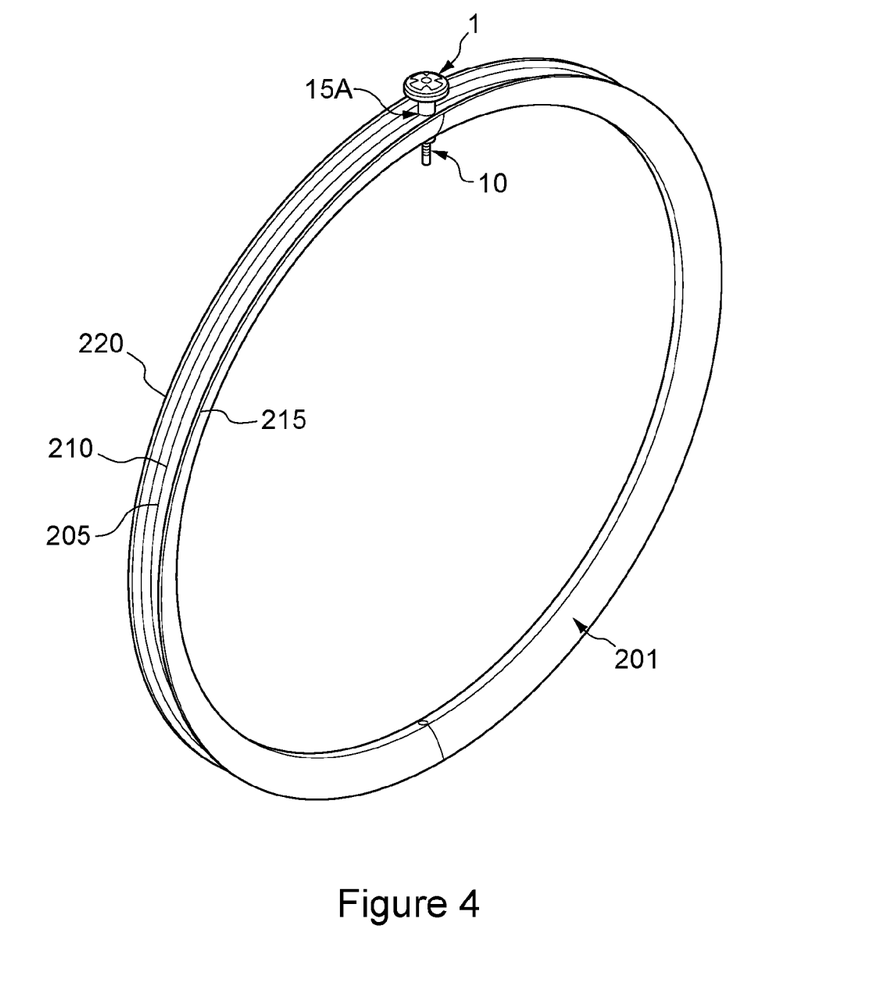
FIG. 4 shows a perspective view of the arrangement shown in FIG. 3.
Figure 5:
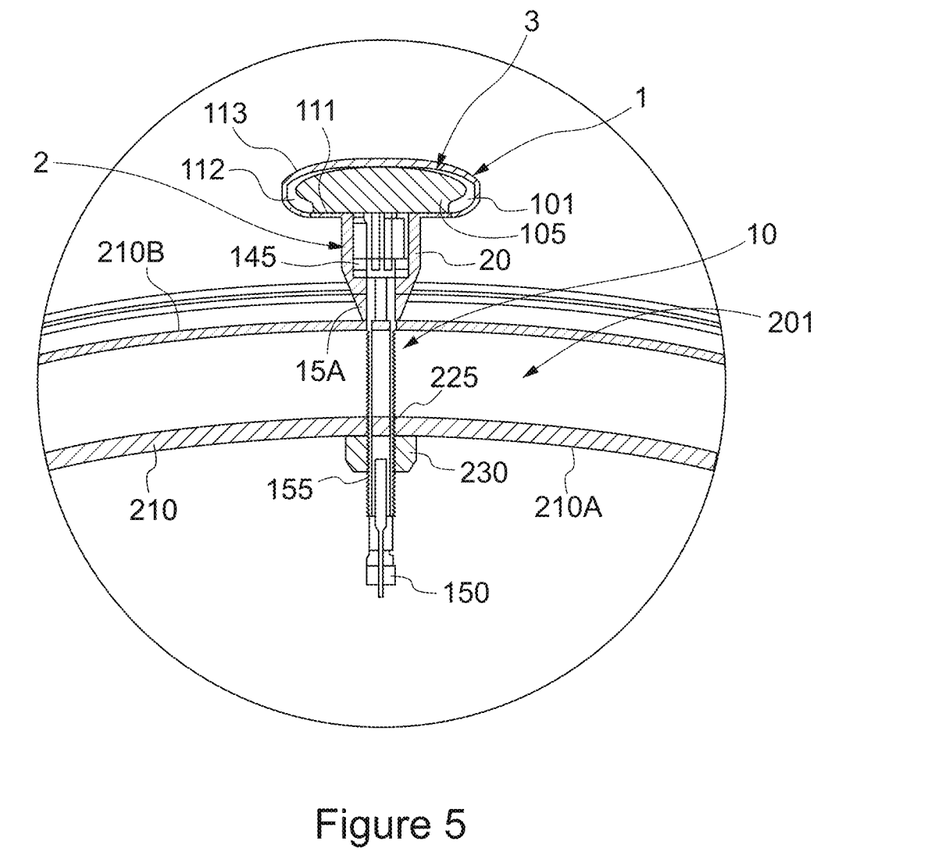
FIG. 5 shows a cross-sectional view of the items shown FIG. 1, and one of the grommets, when fitted to a tyre rim.

FIGS. 3, 4 and 5 then show side-on, perspective and cross-sectional views of housing (indicated generally as 1, and comprising the base 2 and cap 3) containing GPS tracker 5 (not visible in FIGS. 3 and 4), inflation valve 10 and grommet 15A (not visible in FIG. 3) when fitted to tyre rim 201. In FIGS. 3, 4 and 5, the cap 3 has been fitted over the base 2. For ease of reference, the component parts of these items are not labelled in FIGS. 3 and 4.

Tyre rim 201 is circular in shape and, as visible in FIG. 4, has a substantially u-shaped cross-section such that there is provided annular channel 205 which is bounded by base 210 and side walls 215, 220.

As shown in FIG. 5, tyre rim 201 is provided with valve hole 225 in the base 210 and through which the inflation valve 10 is inserted. Inflation valve 10 is secured to interior face 210A of base 210 by locking nut 230 which is screwed onto valve body 155. Again, for ease of reference, not all of the component parts of FIGS. 1 and 2 are labelled in FIG. 5.

In FIGS. 3, 4 and 5, grommet 15A is slid onto valve body 155 of inflation valve 10 such that the narrow end of the truncated cone abuts exterior face 210B of base 210 of type rim 201.

Also in FIGS. 3, 4 and 5, inflation valve 10 is inserted through circular through-hole 140 (not visible in FIGS. 3, 4 and 5) of the lower end 130 of stem 20 of housing 1. This would be done prior to inserting the inflation valve 10 through valve hold 225 in tyre trim 201. The valve core 150 is inserted into circular through-hole 140 first, followed by valve body 155. The circular through-hole 140 has a diameter smaller than that of valve base 145 such that inflation valve 10 is then retained in the stem 20.

The GPS tracker 5 is then inserted into receptacle 105 in the base 2 of housing 1, after which cap 3 is fitted over head portion 101. The resiliently flexible material used to form cap 3 means that it can be stretched over head portion 101 by the user, after which the cap 31 is retained on the head portion 101.

The tyre rim 201 with housing 1 containing GPS tracker 5, inflation valve 10 and grommet 15A attached would them be fitted with a tubeless tyre (not shown). As is known in the art, the tyre is manufactured or treated such that it creates a substantially airtight seal with the rim of the tyre. For example, a sealant may be applied to the inner surface of the tyre.

The invention claimed is:

1. A housing for a GPS tracker, the housing being attachable to an inflation valve and comprising:
   (a) a receptacle in the housing which is shaped to accept a GPS tracker, and
   (b) a connector for attaching the housing to the inflation valve,
   wherein the housing comprises a head comprising the receptacle, and a stem comprising the connector which extends from a lower surface of the head,
   and wherein the receptacle is in the form of a recess which is shaped to accept a GPS tracker,
   the housing comprising a base comprising the head and the stem, and a removable cap which is shaped to fit over the head, wherein the removable cap is shaped to fit over the head such that it forms a cavity which is shaped to enclose a GPS tracker.

2. A housing as claimed in claim 1, wherein the base and/or the removable cap is formed from a resiliently flexible material.

3. A housing as claimed in claim 2, wherein the base is formed from ethylene propylene diene monomer rubber.

4. A housing as claimed in claim 2, wherein the removable cap is formed from fluorosilicone rubber.

5. A housing as claimed in claim 1, wherein the stem comprises one or more apertures for allowing flow of air and/or sealant through the stem.

6. A housing as claimed in claim 5, wherein the stem comprises, at an opposite end to the head, a valve base aperture which is shaped to accept a valve base of an inflation valve.

7. The housing as claimed in claim 1, further comprising an inflation valve, wherein the housing is attached to the inflation valve.

8. The housing of claim 7 comprising a GPS tracker in the receptacle of the housing.

9. The housing claimed in claim 7, wherein a grommet is fitted to the inflation valve.

10. The housing of claim 7, wherein the housing is fitted to a tyre rim.

11. A GPS tracker housing kit comprising:
    a housing,
    wherein the housing comprises a head comprising the receptacle, and a stem comprising the connector which extends from a lower surface of the head,
    the housing comprising a base comprising the head and the stem, and a removable cap which is shaped to fit over the head, wherein the removable cap is shaped to fit over the head such that it forms a cavity which is shaped to enclose the GPS tracker, an inflation valve, and a connector for attaching the housing to the inflation valve.

12. The GPS tracker housing kit of claim 11, further comprising one or more of:

a GPS tracker, wherein the housing comprises a receptacle in the housing which is shaped to accept the GPS tracker, one or more grommets which are shaped to fit around the inflation valve, a tyre rim, and a tyre.

13. An inflation valve comprising a housing for a GPS tracker, the housing comprising a receptacle which is shaped to accept a GPS tracker, wherein the housing comprises a removable cap which is shaped to fit over the head, and wherein the removable cap is shaped to fit over the head such that it forms a cavity which is shaped to enclose a GPS tracker.

14. An inflation valve as claimed in claim 13, wherein the housing comprises a head comprising the receptacle.

15. An inflation valve as claimed in claim 14, wherein the receptacle is in the form of a recess which is shaped to accept a GPS tracker.

16. An inflation valve as claimed in claim 13, wherein the head and/or the removable cap is formed from a resiliently flexible material.

17. An inflation valve as claimed in claim 16, wherein the head is formed from ethylene propylene diene monomer rubber.

18. An inflation valve as claimed in claim 16, wherein the removable cap is formed from fluorosilicone rubber.

19. A GPS tracker housing kit comprising:

(a) an inflation valve of claim 13, and one or more of:

(b) a GPS tracker, (c) one of more grommets which are shaped to fit around the inflation valve, (d) a tyre rim, and (e) a tyre.

20. An inflation valve as claimed in claim 13, comprising the GPS tracker in the receptacle of the housing.

21. An inflation valve as claimed in claim 20, wherein a grommet is fitted to the inflation valve.

22. An inflation valve as claimed in claim 20, when fitted to a tyre rim.

* * * * *